UNITED STATES PATENT OFFICE.

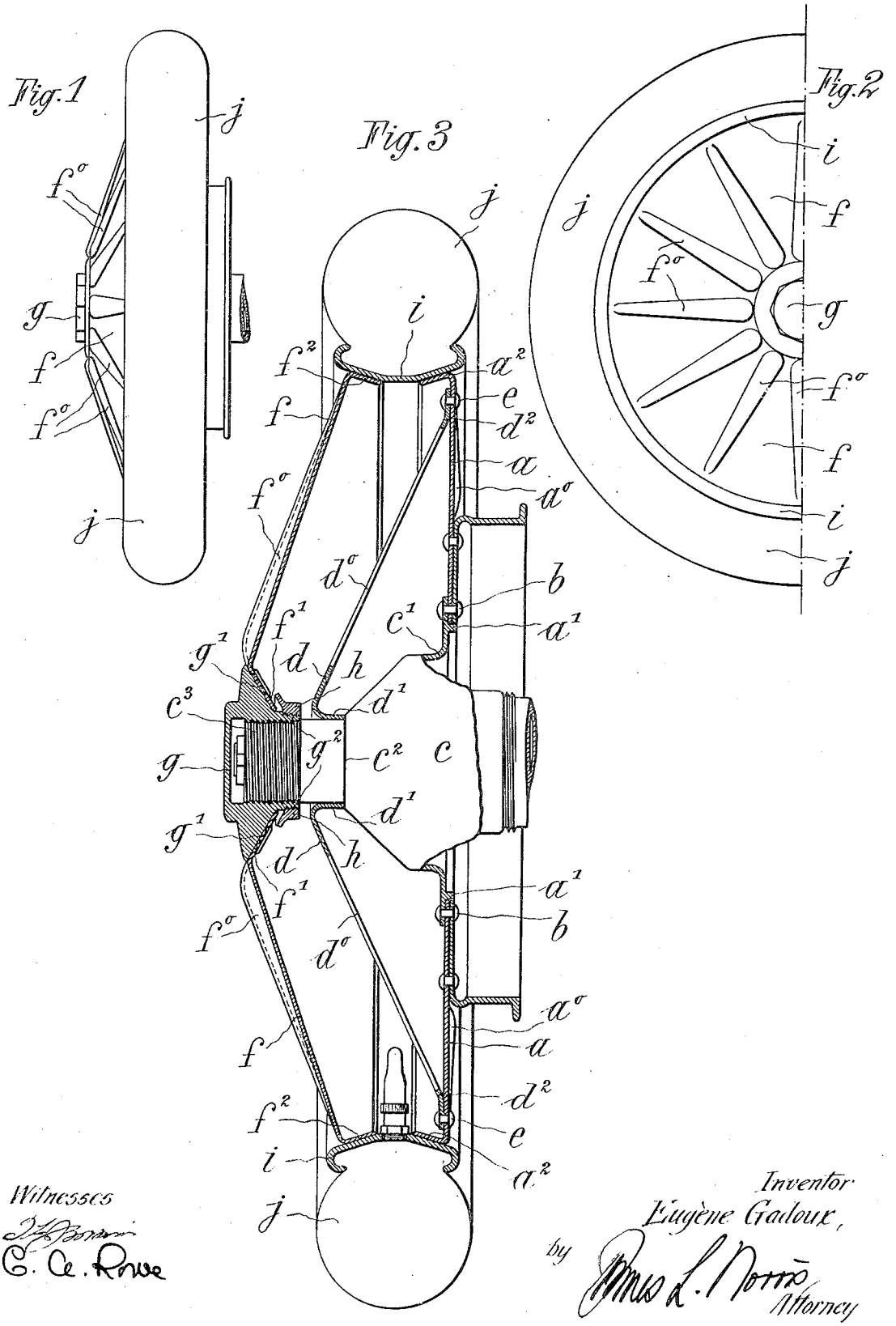

EUGÈNE GADOUX, OF ASNIERES, FRANCE.

VEHICLE-WHEEL.

1,205,882.   Specification of Letters Patent.   Patented Nov. 21, 1916.

Application filed September 10, 1913. Serial No. 789,197.

*To all whom it may concern:*

Be it known that I, EUGÈNE GADOUX, a citizen of the French Republic, residing at Asnieres, Seine, France, have invented certain new and useful Improvements in Vehicle-Wheels, of which the following is a specification.

This invention relates to vehicle wheels and more particularly to wheels of dished construction, (*i. e.*, having their rims located at one side of the center of the hub), and which are provided with pneumatic or equivalent tires, the rims of which are detachable from the wheel proper.

The objects of the invention, briefly stated, are to provide a wheel construction of the character described which may be manufactured at relatively low cost and at less cost than the ordinary dished wheel; to provide a wheel construction wherein the rim which carries the tire may be removed and fitted with special facility, and when assembled in relation to the wheel, shall be held with great security by means of simple mechanical nature; and to provide a wheel of the character described which, as an entirety, shall be simple in its structural details, and exceedingly strong and serviceable.

Other objects and advantages will appear as the description proceeds.

An embodiment of the invention is illustrated in the accompanying drawings, wherein:—

Figures 1 and 2 are side and front elevations, respectively, of a wheel in which the features of the invention are incorporated; Fig. 3 is a cross-sectional view of the improved wheel with the parts thereof in assembled relation.

Similar characters of reference designate corresponding parts throughout the several views.

The wheel body comprises an inner cheek $a$, an intermediate cheek $d$ and an outer cheek $f$.

The cheek $a$ is normal to the axis of the hub $c$ and is flat throughout its extent, being preferably provided with radial strengthening ribs $a°$. The cheek $a$ is also preferably carried by the hub, for this purpose having an enlarged central opening which receives an annular shoulder on a hub flange $c'$ and adjacent said opening being secured, preferably by rivets $b$ to said hub flange.

The intermediate cheek $d$, which is preferably provided with slots $d°$ for the purpose of reducing weight, is of conical outline and has at its center an in-turned annular or cylindrical flange $d'$ and at its outer margin a substantially flat flange $d^2$. The flange $d^2$ is secured to the cheek $a$ preferably by rivets $e$ and the flange $d'$ closely surrounds the outer portion of the hub $c$, its inner end abutting an annular shoulder $c^2$ of said hub.

The cheek $f$ is of frusto-conical form, being preferably provided with radial strengthening ribs $f°$, and projects outwardly in the same general direction as the cheek $d$. The cheek $f$ has a central reëntrant conical flange $f'$, provided with a central opening, and is secured in position relatively to the hub by a cap $g$, provided with internal threads for engagement with threads $c^3$ provided on that portion of the hub $c$ which projects beyond the cheek $d$. The cap $g$ has a conical inner surface $g'$ of substantially the same degree of conicity as the flange $f'$ and the said surface $g'$ bears conformably against said flange. The cap $g$ is provided at its inner end with external threads $g^2$ and a nut $h$ is mounted upon the said cap $g$, engaging the said threads $g^2$, the face of said nut which adjoins the flange $f'$ being conical or dished to conform to the conicity of said flange. The extent of the threads $g^2$ and the coniform outline of the dished face of the nut $h$ are so selected that the space between said nut and the conical face $g'$ of the cap $g$ is somewhat wider than the thickness of the flange $f'$.

The cheeks $a$ and $f$ are provided with in-turned marginal flanges $a^2$ and $f^2$, respectively, which are slightly coniform and, therefore, have a converging or tapering relation. The flanges $a^2$ and $f^2$ conjointly provide a locking seat for the rim $i$ which carries the tire $j$. The said rim has its inner circumference formed at opposite sides thereof with inclined faces which conform to the conicity of the flanges $a^2$ and $f^2$ and engage uniformly upon said flanges.

In assembling the wheel, the unit composed of the hub $c$ and the cheeks $a$ and $d$ is fitted within the rim $i$, the flange $a^2$ engaging against the adjacent inclined surface of said rim, and thereafter the cheek $f$ is fitted at the other side of the rim by screwing the cap $g$ upon the threads $c^3$. As the cap $g$ is screwed inwardly, the flange $f^2$ ultimately engages the other inclined surface of the rim $i$ and thereby complements the flange $a^2$ in providing a locking seat for said rim. After the engagement of the flange $f^2$ against the rim $i$, further inward movement of the cap $g$, (which, of course, will be very slight), increases the friction with which the flanges $f^2$ and $a^2$ engage the rim $i$ and tends to spring the central portion of the cheek $f$ inwardly in opposition to the inherent resiliency of said cheek. The central portion of the cheek $f$ which is thus sprung inwardly by the cap $g$ of course presses with considerable force against said cap and thereby reliably holds the cap against accidental rotation in a direction to provide for its disengagement from the hub $c$.

The cheek $d$ constitutes an efficient brace or reinforcement for the inner cheek $a$ and permits such an arrangement of the rim that the vertical plane passing through the point of contact of the tire with the ground and parallel to the longitudinal axis of the vehicle shall be as close as possible to said longitudinal axis.

The assemblage of the wheel parts is insured by a single element, to wit; the cap $g$, but the said cap is efficiently held against displacement from the hub by the resilient action of the cheek $f$ as above explained; and, hence, while only a single element is used for the assemblage of the wheel parts, such assemblage is at all times secure and reliable. The dismantling of the wheel and the removal of the rim may be accomplished with ease and facility, the only operation required being to unscrew the cap $g$ from the hub $c$, and the assemblage of the wheel and the rim may be accomplished with equal facility, the only operation required, (apart from the organization of the unit composed of the hub $c$ and cheeks $a$ and $d$), being the screwing of the cap $g$ upon said hub in the manner described.

The flanges $a^2$ and $f^2$ preferably terminate short of one another, as shown, to provide an intermediate space through which the valve of the tire may project, this relation avoiding the necessity for recessing said flanges to accommodate said valve.

It is preferred to provide an inter-lock relation between the cap $g$ and the flange $f'$ of the cheek $f$, and for this purpose, said flange and the face $g'$ of said cap have inter-engaging recesses and projections. A similar inter-lock may, if desired, be provided between the flanges $a^2$ and $f^2$ or either of them and the rim $i$.

What I claim as my invention and desire to secure by Letters Patent is:—

1. A dished vehicle wheel comprising, in combination, a hub, a rim, inner and outer cheeks of stamped metal to connect the hub and the rim, the inner cheek being flat and normal to the axis of the hub and the outer cheek being dished, the cheeks having peripheral means to engage the rim at opposite sides thereof and thereby retain the rim in position, a dished counter-cheek secured at its circumference to the inner cheek and having a cylindrical flange at its center adapted to take over the hub, the inner cheek being carried by the hub, and means engaging the hub and the central portion of the outer cheek for securing the outer cheek in operative position.

2. A dished vehicle wheel comprising, in combination, a hub, a rim, inner and outer cheeks to connect the hub and the rim, said cheeks having peripheral means to engage the rim at opposite sides thereof and thereby retain the rim in position and the outer cheek being of outwardly directed frusto-conical form and having a central opening and a reëntrant conical flange adjacent said opening, and a nut engaging with the outer end of the hub and having a conical face to conformably engage said reëntrant conical flange.

3. A dished vehicle wheel comprising, in combination, a hub, a rim, inner and outer cheeks to connect the hub and the rim, said cheeks having peripheral means to engage the rim at opposite sides thereof and thereby retain the rim in position and the outer cheek being of outwardly directed frusto-conical form and having a central opening and a reëntrant conical flange adjacent said opening, and a nut engaging with the outer end of the hub and having a conical face to conformably engage said reëntrant conical flange, the engaging faces of said nut and said flange having intermatching grooves and projections.

4. A dished vehicle wheel comprising, in combination, a hub, a rim, having oppositely directed conical surfaces at its sides, inner and outer cheeks to connect the hub and the rim, conical flanges at the peripheries of said cheeks to conformably engage the conical surfaces of said rim, the outer cheek being of outwardly directed frusto-conical form and having a central opening, and a reëntrant conical flange adjacent said opening, and a nut engaging with the outer end of the hub and having a conical face to conformably engage said reëntrant conical flange.

In testimony whereof I have hereunto set may hand in presence of two subscribing witnesses.

EUGÈNE GADOUX.